United States Patent [19]

Bradbury et al.

[11] 4,128,211

[45] * Dec. 5, 1978

[54] COLORANT COMMINUTING APPARATUS FOR PLASTIC ARTICLE FORMING MACHINE

[75] Inventors: William B. Bradbury, Brielle, N.J.; Robert H. Watts, Cincinnati; E. Timm Scott, Norwalk, both of Ohio

[73] Assignee: PMS Consolidated, Somerset, N.J.

[*] Notice: The portion of the term of this patent subsequent to Nov. 8, 1994, has been disclaimed.

[21] Appl. No.: 791,936

[22] Filed: Apr. 28, 1977

Related U.S. Application Data

[63] Continuation-in-part of Ser. No. 650,938, Jan. 21, 1976, Pat. No. 4,057,193.

[51] Int. Cl.² .............................................. B02C 19/00
[52] U.S. Cl. .................... 241/101.6; 241/281
[58] Field of Search ...................... 241/101.6, 191, 281; 221/10, 17, 174; 198/524, 560

[56] References Cited

U.S. PATENT DOCUMENTS

| | | | |
|---|---|---|---|
| 1,970,574 | 8/1934 | Pelosi | 198/524 |
| 2,672,219 | 3/1954 | Skillman | 198/560 |
| 3,426,674 | 2/1969 | Testolin | 241/191 |
| 3,530,754 | 9/1970 | Kalman | 83/355 |
| 3,811,627 | 5/1974 | Bradbury et al. | 241/281 |
| 3,941,318 | 3/1976 | Ballinger et al. | 241/101.6 |
| 4,057,193 | 11/1977 | Bradbury et al. | 241/281 |

Primary Examiner—Granville Y. Custer, Jr.
Attorney, Agent, or Firm—Fisher, Christen & Sabol

[57] ABSTRACT

An apparatus is disclosed for comminuting a colored pigment bar and mixing the comminuted pigment with an uncolored plastic material to form a colored plastic material which is subsequently molded or extruded into a colored plastic article. The apparatus features a rotating, discontinuous cutting blade to minimize static electricity formation so as to allow more thorough mixing of the pigment with the uncolored material. A storage mechanism is also disclosed to store the colored pigment bars and bring them into contact with the cutting blade.

5 Claims, 12 Drawing Figures

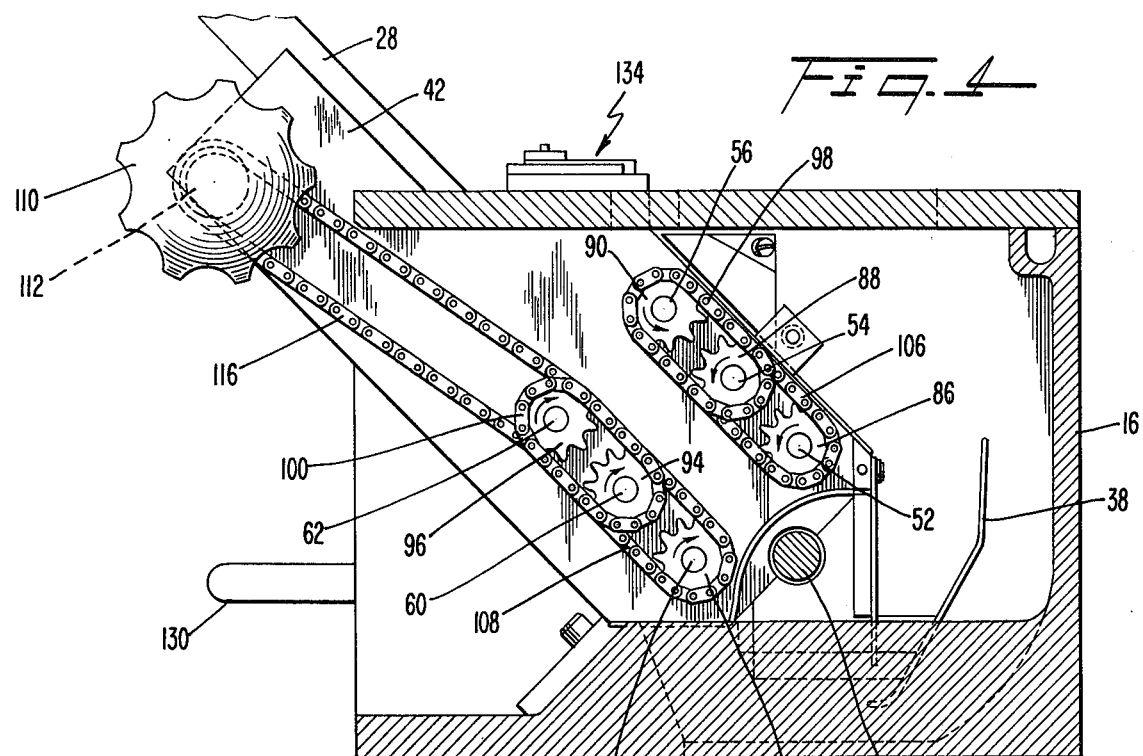
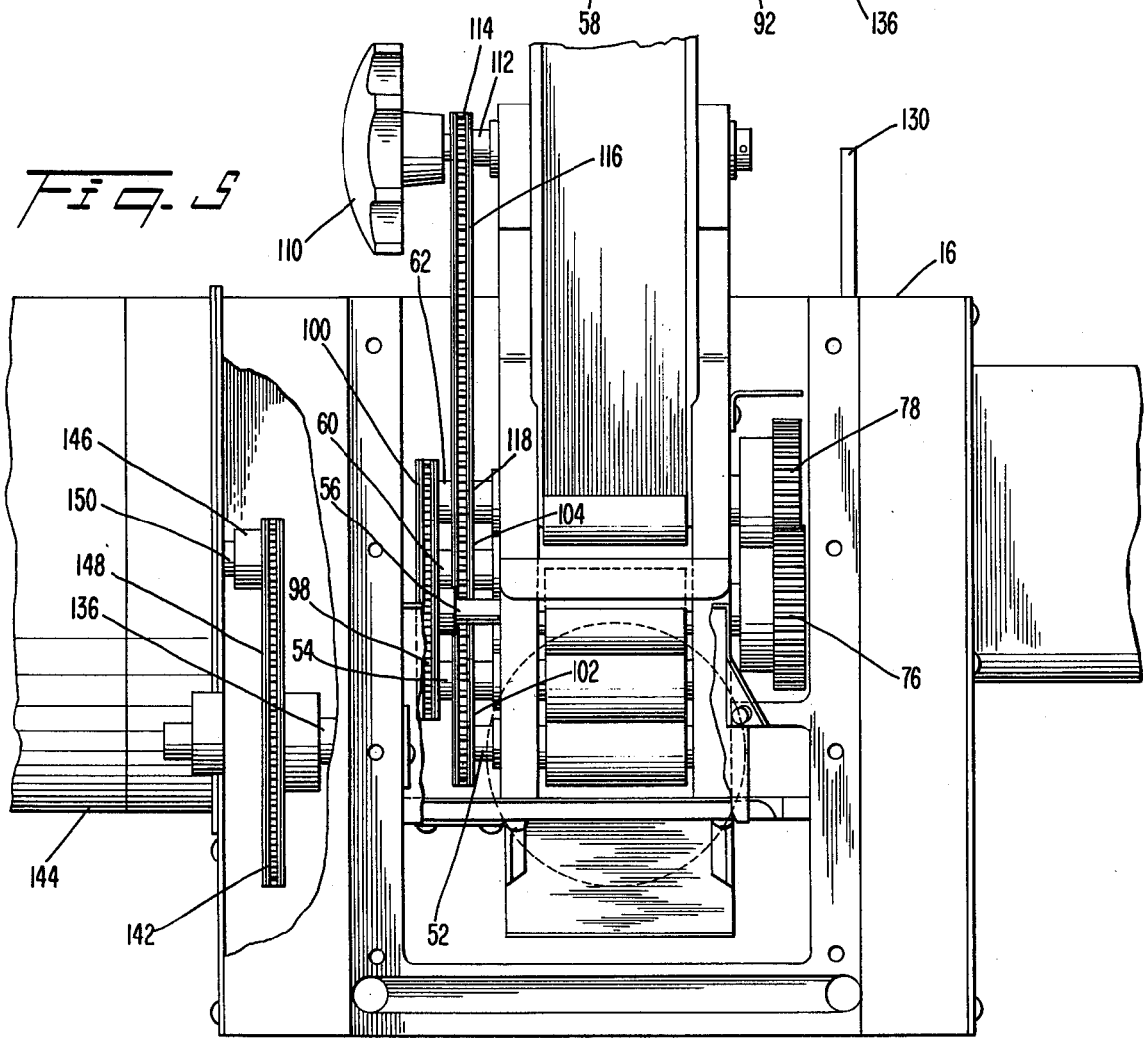

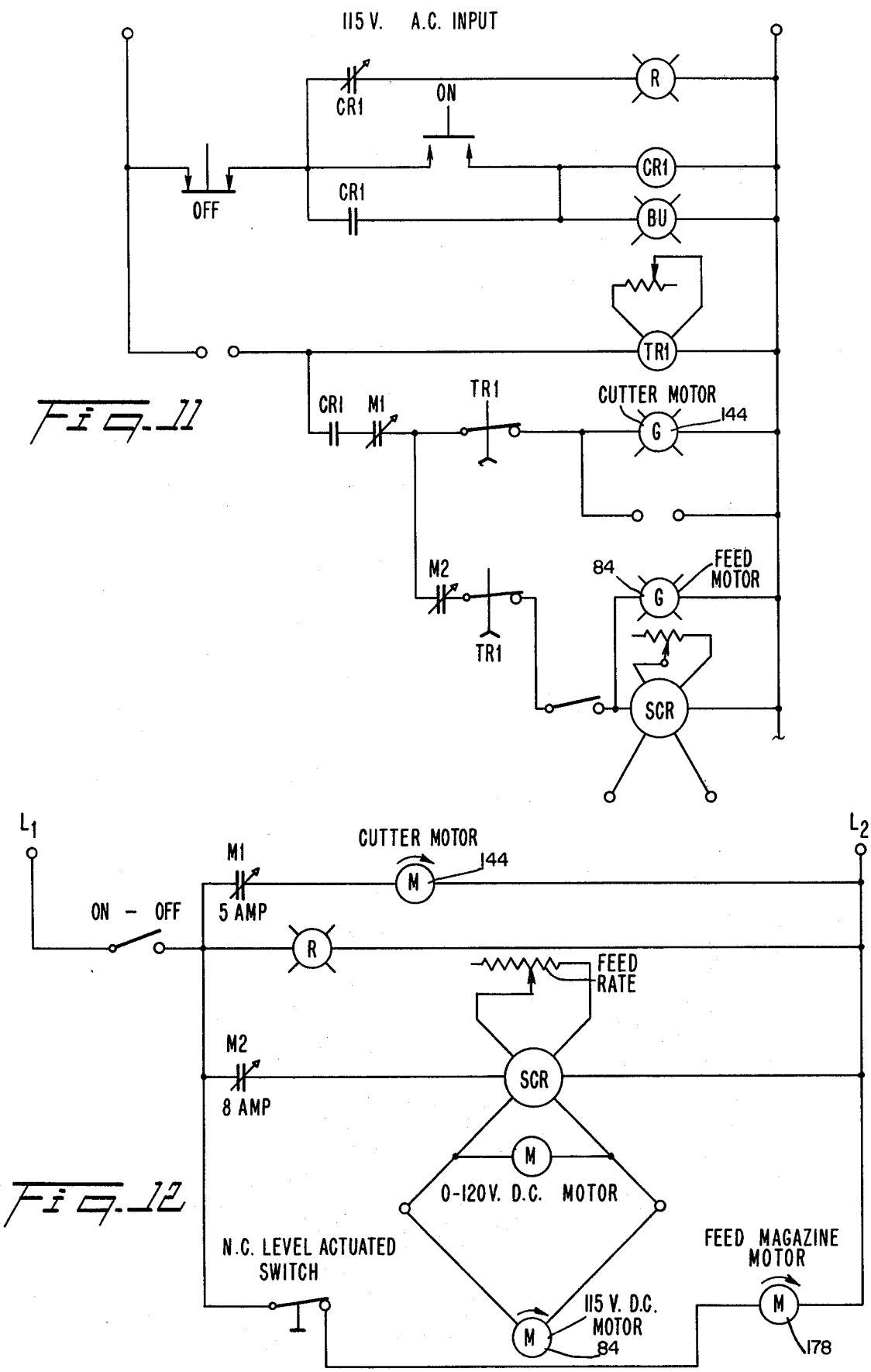

COLORANT COMMINUTING APPARATUS FOR PLASTIC ARTICLE FORMING MACHINE

This application is a Continuation-In-Part of U.S. application Ser. No. 650,938 filed on Jan. 21, 1976 now U.S. Pat. No. 4,057,193, issued on Nov. 8, 1977.

BACKGROUND OF THE INVENTION

1. Field of the Invention

This invention relates to an improved apparatus for comminuting and introducing a pigment into molded or extruded plastic articles.

2. Brief Description of the Prior Art

U.S. Pat. No. 3,530,754 teaches an apparatus for introducing pigment concentrate into thermomechanically formed plastic articles. The pigment concentrate is in the form of a long ribbon or strand which is formed from pigment and plastic. At least two pigment strands are fed into a rotary cutting device which continuously cuts off the end of each pigment strand to form sized pigment slices. The pigment slices are stated to have a dimension between 0.001 inch and 0.008 inch. The cutting is achieved by means of a rotary cutting blade working in conjunction with at least two anvils. The pigment strands are cut into slices. Also, the feed rate of the pigment is controlled by the speed of rotation of a feed roller which is operated by a variable speed motor. The amount of pigment cannot be measured by means of a time control which can be preset.

U.S. Pat. No. 2,739,647 discloses an apparatus for simultaneously granulating multiple strips of thermoplastic material for use in an injection molding machine. The ends of the multiple strips are gradulated by means of rotating blades. The multiple strips are formed from a continuous sheet which is cut into strips which are of a width regulated by the distance between cutting discs. Very fine grains can be formed only when the cutting discs have a reduced thickness and when a high speed motor is used with the rotary cutter. So it is seen that very fine grains can be obtained only when very thin feed material is fed into the rotary cutter.

U.S. Pat. No. 3,529,777 discloses a process of granulating plastic sheets into chips about ¼ inch wide. The sheet is passed through a pair of meshing cutters which cut through the sheet so as to form the chips. The sheet is not comminuted into a fine powder because the chips must always have one dimension which is equal to the thickness of the original sheet. This patent, at col. 7, lines 36 to 38, speaks of obtaining chips which are about ¼ inch wide and, at col. 4, lines 63 to 66, speaks of a sheet feed material which has a thickness of about 0.031 inches. So it is seen that a powder material is not contemplated as being obtainable by this patent. A perforated screen is disclosed which causes recirculation of chopped pieces in order to further reduce their size, but the holes in the screen cannot be much smaller than the size of the original chopped pieces or else the build-up of material will back up to a point where the feed sheet cannot be fed into the multiple chopping blades. The chopped up material compacts into a mass that results in no material passing through the screen holes. The rotating cutters merely spin without any material being recirculated therebetween. Also, the comminuting is not achieved by directing the sheet directly into a rotating cutter.

U.S. Pat. No. 1,764,202 discloses a device for cutting continuous lengths of yarn, thread or filaments into short lengths by means of an apparatus which utilizes a stationary blade and a revolving blade. U.S. Pat. No. 2,143,252 discloses the use of a shearing device having a rotating blade and a stationary blade having a high natural frequency of oscillation. The shearing device is used to cut threads. U.S. Pat. No. 2,850,421 teaches cutting long, synthetic, extruded fibers into short lengths by means of a rotating, single blade disc which achieves the cutting perpendicular to the direction of travel of the long fibers. U.S. Pat. No. 3,350,971 teaches converting a sheet material into chips.

U.S. Pat. No. 3,811,627, the pertinent portions of which are incorporated herein by reference, teaches the use of particular apparatus and method for mixing a pigment into a plastic, whereby the resulting mixture may be molded or thermomechanically formed into a plastic article. Therein a cutter is described as being a spiral cutter having teeth and a rakelike action. This patent uses a common motor to rotate the continuous spiral cutter and to actuate the feed mechanism which feeds the pigment into contact with the cutter. This feed mechanism is complex and has proven to be unreliable in actual usage. Furthermore, the use of such a common motor does not permit accurate, independent adjustment of the pigment feed rate and cutter speed.

SUMMARY OF THE INVENTION

This invention relates to an apparatus for comminuting a solid colored pigment bar and subsequently mixing the pigmented particles with a flowable, uncolored plastic material. The thusly colored plastic material is subsequently formed into a colored plastic article such as by molding or extruding.

The invention is ideally used in conjunction with a molding or extrusion machine and a storage hopper. The invention is located beneath the storage hopper such that the flowable plastic resin flows down through the invention, is mixed with the pigment particles and passes into the molding or extrusion machine.

The invention comprises a housing located between the forming machine and the hopper, a rotating cutter contained within the housing, a feeding mechanism removably attached to the housing to feed the pigment bars into the cutter, and storage means to store the pigment bars and transfer them to the feeding mechanism. There may also be a sliding valve between the hopper and the housing to prevent flow out of the hopper when the apparatus is shut down.

The cutter comprises a plurality of individual cutting elements attached to a rotating shaft and arranged in rows. The cutting elements are individually removable for easy replacement or resharpening. The build up of static electricity is also prevented since the cutting elements of one row are out of contact with the pigment bar before the cutters of the following row come into contact with the bar. This discontinuous contact prevents the build up of static electricity which would cause the comminuted pigment to adhere to the cutter and other metal surfaces within the housing rather than being mixed with the resin.

The feeding mechanism is retained in the housing by a single latch and is removable from the housing as a unit to facilitate cleaning or when changing pigment bar colors. The feeding mechanism has a series of rollers disposed above and below the pigment bar to feed the bar into the cutter. The rollers are driven by a motor separate from that driving the cutter to provide a more accurate control over the feed rate of the pigment.

BRIEF DESCRIPTION OF THE DRAWINGS

FIG. 4 is a side cross-sectional view of the comminuting device of FIG. 1 taken along lines C—C of FIG. 7.

FIG. 5 is a top view, partially broken away of the comminuting device according to the invention.

FIG. 11 is a schematic diagram of the circuit of the control panel of FIG. 10.

FIG. 12 is a schematic diagram of an alternative circuit for the control panel used with the device according to the invention.

DETAILED DESCRIPTION OF THE PREFERRED EMBODIMENT

Figure 1:
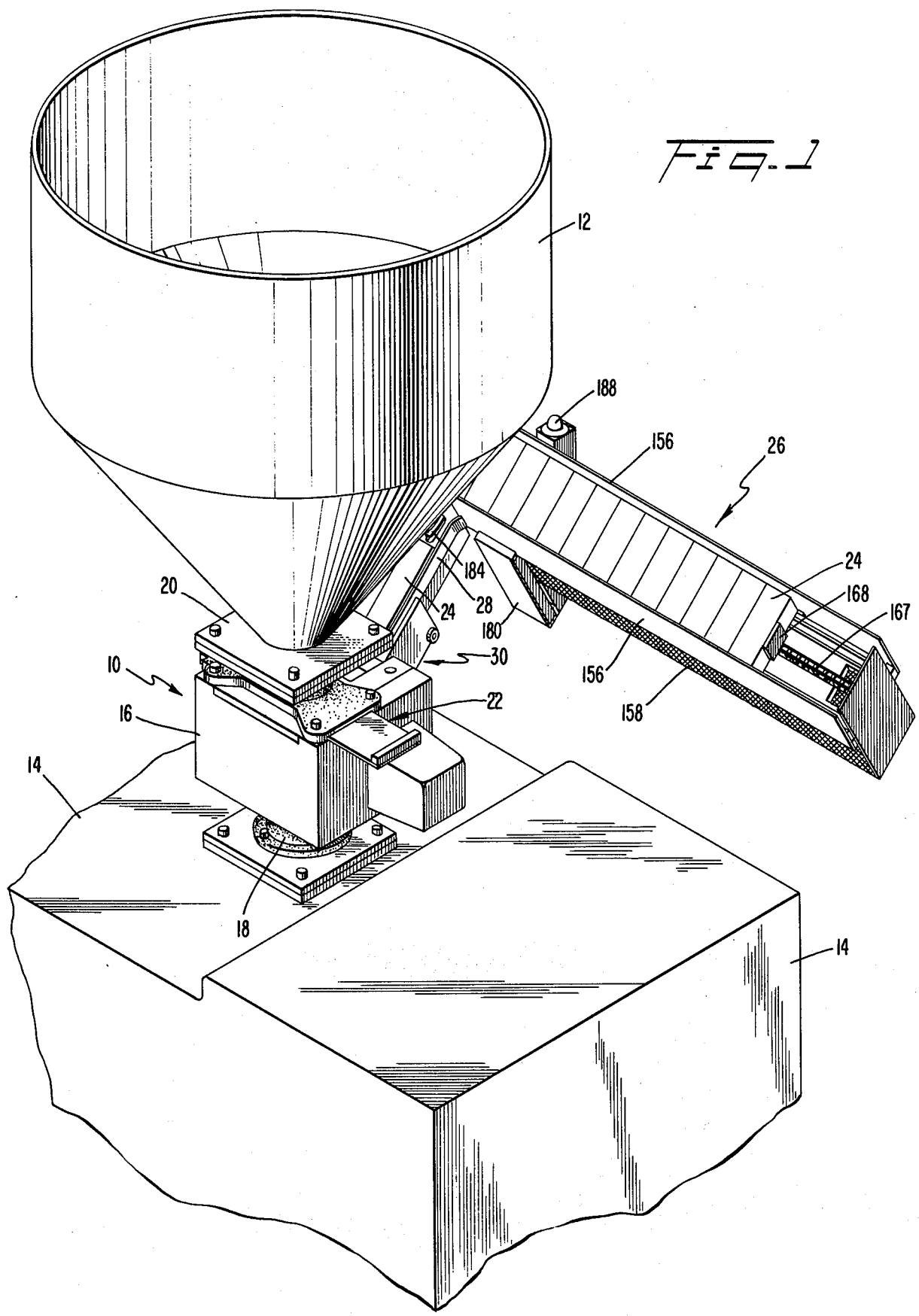
FIG. 1 is a perspective view of the comminuting apparatus according to the invention in operative association with a molding machine.

The comminuting device according to the present invention is shown generally at 10 in FIG. 1 and is located between resin storage hopper 12 and molding machine 14. Although the device will be described in conjunction with a molding machine, it is understood that it may be used with any machine for forming plastic articles.

Housing 16 is attached to molding machine 14 via hollow adaptor 18. Similarly, hopper 12 is attached to housing 16 by way of mounting plate 20. Uncolored resin is placed into hopper 12 and flows downwardly into housing 16 when slide valve 22 is opened. Slide valve 22 is normally manually operated, but may be automated by known valve operating means.

The pigment bars 24 are stored in magazine 26 and, upon reaching chute 28, slide down into the feeding mechanism 30 attached to housing 16. Magazine 26 has means, to be described hereinafter, for moving the bars toward the chute 28 so that they may slide down one at a time. Means for supporting the magazine 26, such as brackets attached to the molding machine, are standard items and have been omitted for purposes of clarity.

Figure 2:
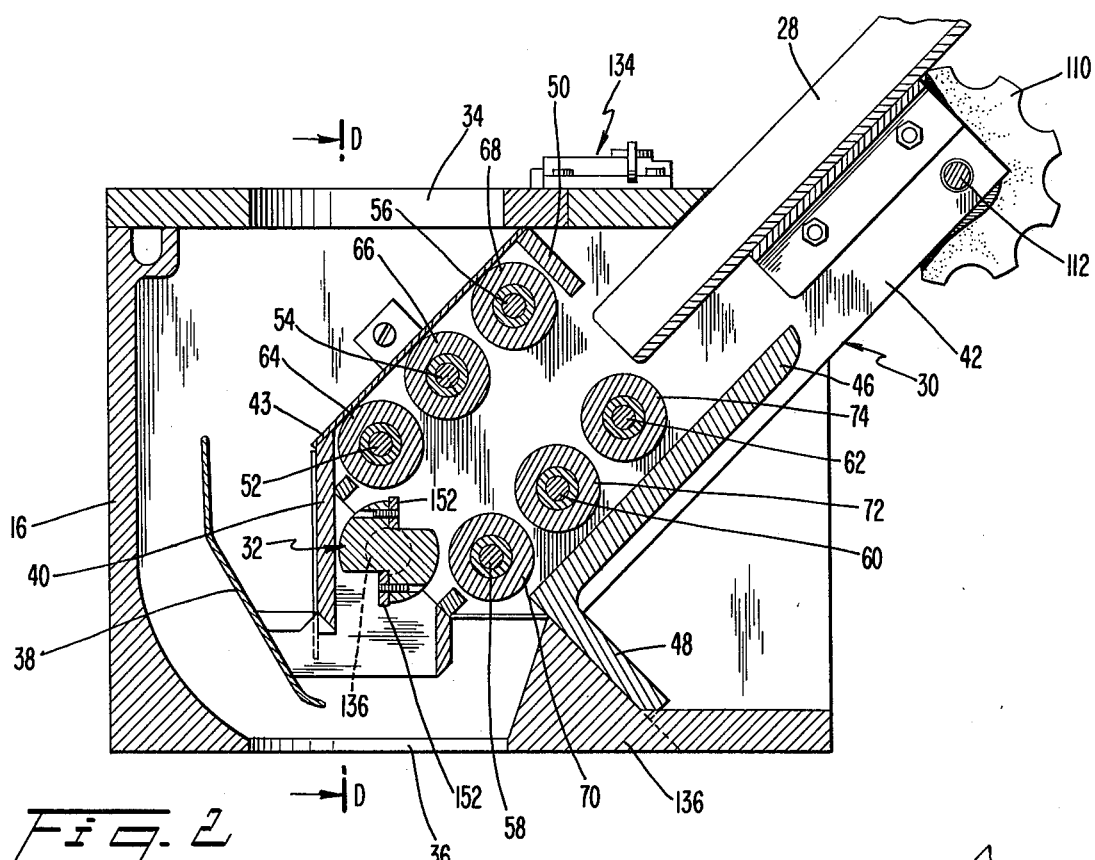
FIG. 2 is a side cross-sectional view of the comminuting device of FIG. 1 taken along lines A—A of FIG. 7.

FIG. 2 shows a cross-section of housing 16, feeding mechanism 30 cutter 32, and a portion of chute 28. Housing 16 has opening 34 through its upper wall which communicates with hopper 12 and opening 36 through its bottom wall which communicates with adapter 18 and molding machine 14. Baffle 38 spans across the housing 16 and serves to direct a portion of the resin flowing down from the hopper 12 toward the comminuted pigment particles to facilitate the mixing of the pigment with the resin. Wall 40 also spans the interior of housing 16 and prevents resin from contacting the cutter, as does wall 43.

Feeding mechanism 30 comprises sidewalls 42 and 44 connected by bottom wall 46, having angled extension 48, and spacer bar 50. Rollers 64, 66, 68, 70, 72, and 74 are attached to shafts 52, 54, 56, 58, 60 and 62, respectively, which are rotatably attached to sidewalls 42 and 44. The rollers are preferably constructed of hard rubber so as to exert the requisite frictional driving force on the pigment bars, however, any other suitable material may be used.

Figure 3:
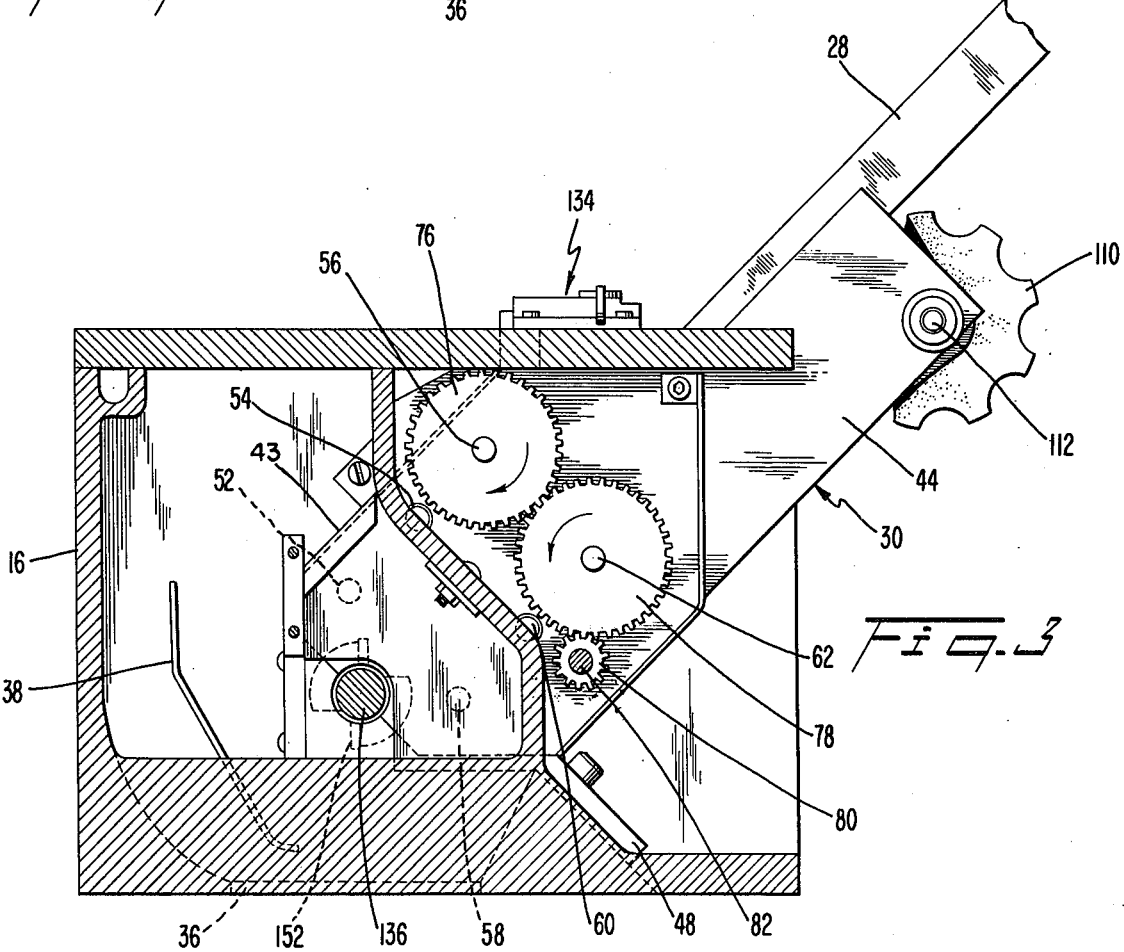
FIG. 3 is a side cross-sectional view of the comminuting device of FIG. 1 taken along lines B—B of FIG. 7.

Rollers 64, 66, 68, 70, 72 and 74 are driven by the mechanism shown in FIGS. 3, 4 and 5. As seen in FIG. 3, shafts 56 and 62 extend through sidewall 44 of feeding mechanism 30 and are attached to intermeshing gears 76 and 78, respectively. Gear 78 also engages drive gear 80 which is rotated by drive shaft 82 of motor 84. Thus, when shaft 82 rotates, shafts 56 and 62, along with their respective rollers 68 and 74 are also rotated.

The mechanism for rotating the remaining rollers is seen in FIGS. 4 and 5. All of the shafts 52, 54, 56, 58, 60 and 62 extend through sidewall 42 of feeding mechanism 30. Gears 86, 88, 90, 92, 94 and 96 are attached to the aforementioned shafts so as to rotate therewith. Chain 98 drivingly connects gears 88 and 90, while chain 100 drivingly connects gears 94 and 96. Thus rotation of shafts 56 and 62 as previously described, will also cause rotation of shafts 54 and 60 due to chains 98 and 100 interconnecting gears 88 and 90, and gears 94 and 96. Also attached to shafts 54 and 60 are gears 102 and 104, respectively, which rotate with the shafts. Chain 106 drivingly connect gears 86 and 102 such that shaft 52 rotates when shaft 54 rotates. Chain 108 drivingly connects gears 92 and 104 such that rotation of shaft 60 causes rotation of shaft 58. Thus it can be seen that the gears and chains interconnect all of the rollers on the top and all of the rollers on the bottom and are caused to rotate by motor 84.

Handwheel 110 is rotatably attached to feeding mechanism 30 by shaft 112, which also has gear 114 mounted thereon. Chain 116 drivingly connects gear 114 with gear 118 mounted on shaft 62. Thus, when driving gear 80 is disengaged from gear 78 (by means to be described hereinafter), the rollers may be rotated manually by rotating handwheel 110. This allows for manual adjustment of the feeding of the pigment bars into the cutter.

Figure 6:
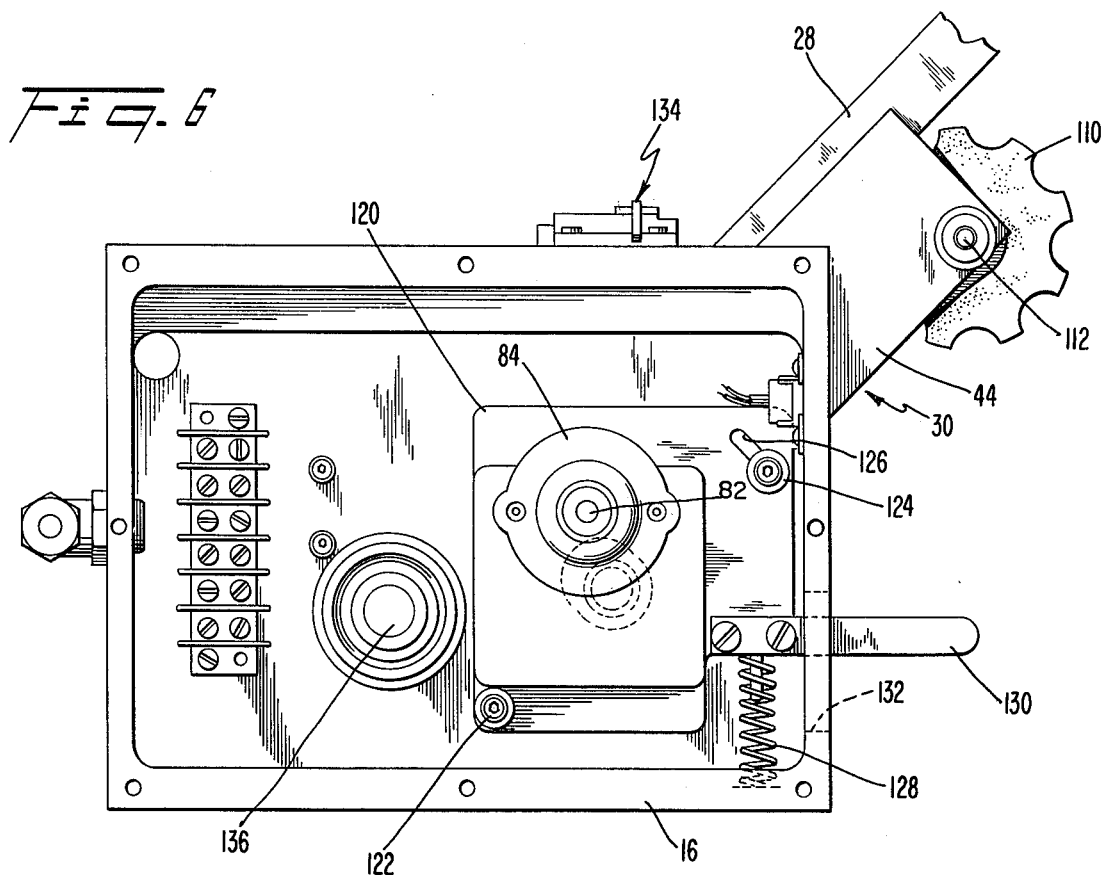
FIG. 6 is a side view of the comminuting device of FIG. 1 with the side cover plate removed.

As best seen in FIG. 6, motor 84, having output shaft 82, is fixedly attached to plate 120 which is, in turn, pivotally attached to housing 16 via pivot 122. Bolt 124 extends through slot 126 in plate 120 and engages the housing 16. Slot 126 allows the plate a limited degree of rotation about pivot 122. Spring 128 engages the housing 16 and the plate 120 and tends to rotate the plate 120 in a counterclockwise direction about pivot 122. Arm 130 is rigidly attached to plate 120 and extends through slot 132 to the exterior of housing 16. Disengagement of gear 80 from gear 78 is achieved by manually displacing arm 130 in a downward direction, as seen in FIG. 6, thereby causing plate 120 to pivot in a clockwise direction about pivot 122, along with motor 84 and shaft 82. Once gears 80 and 78 have been disengaged, the rollers may be rotated manually by handwheel 110 as previously described.

Feeding mechanism 30 is retained in housing 16 by means of latch 134, which may be a standard cam operated mechanism or other standard latch mechanism. Angled extension 48 bears against angled portion 136 of housing 16 to help support the feeding mechanism in its proper position. Unlatching latch 134 allows the feeding mechanism to be removed from housing 16 as a complete unit to facilitate cleaning or maintenance.

Figure 7:
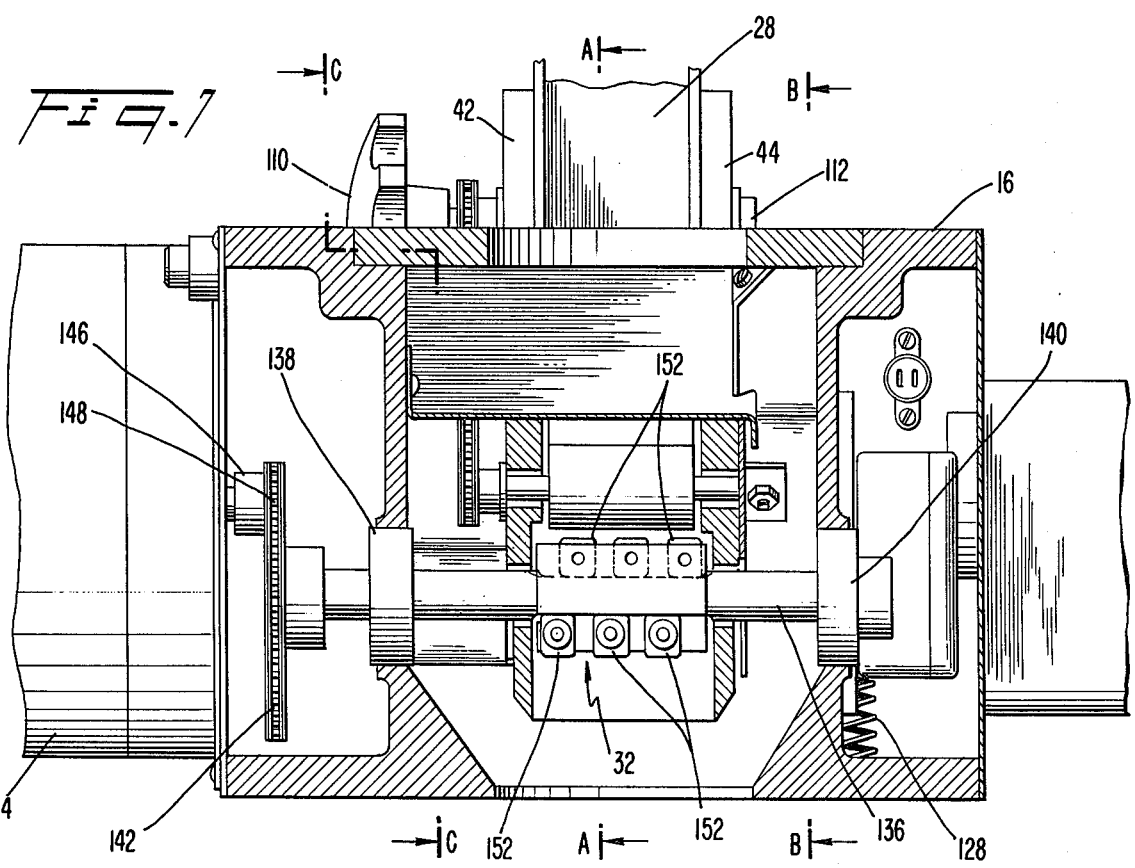
FIG. 7 is a front cross-sectional view taken along lines D—D of FIG. 2.
Figure 8:
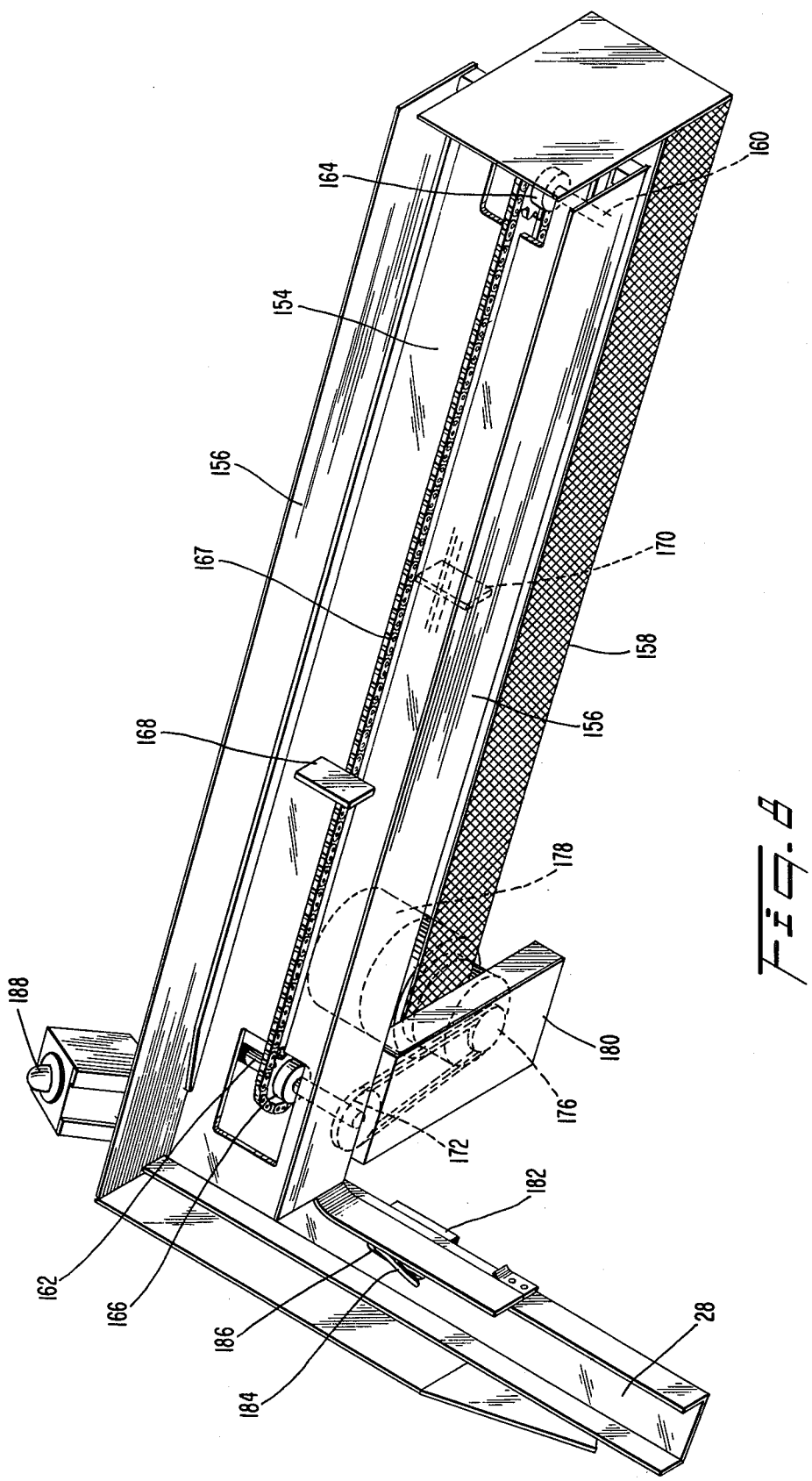
FIG. 8 is a perspective view of the magazine assembly shown in FIG. 1.

Cutter assembly 32 comprises shaft 136 rotatably supported in housing 16 by bearings 138 and 140. Gear 142 is attached to one end of shaft 136 and is drivingly connected to motor 144 via gear 146 and chain 148. Gear 146 is attached to output shaft 150 of motor 142. Cutter assembly 32 has a plurality of cutting elements 152 mounted thereon arranged in circumferentially displaced rows and extending generally radially from shaft 136. Cutting elements are removably attached to shaft 136 by bolts or the like, and comprise generally square pieces of hard material having cutting edges around its periphery. Thus, as one cutting edge becomes dull, the cutting elements 152 need only be rotated about their central attaching point to present a new cutting edge. Also, should one element become exceedingly dull or broken, only that element need be replaced and not the entire cutter assembly. Although two rows of cutting elements are shown, obviously any number of rows may be used, as long as only one row is in contact with the pigment bar at any given time. This discontinuous contact between the cutter and the pigment bar prevents the build up of static electricity which makes the comminuted pigment particles adhere to the cutter and other metal surfaces inside the housing rather than being mixed with the incoming resin. This, coupled with a trace of metallic substance in the pigment bars and grounding the system throughout back to the power supply eliminates the static charge build up. The cutting elements 152 are also staggered laterally as shown in FIG. 7.

Magazine 26 comprises a main frame 154, which may be a structural channel or the like, having side plates 156 attached thereto and extending upwardly to act as a guide for the pigment bars. Main frame 154 also has bottom cover 158 attached thereto by screws or other suitable means. Shafts 160 and 162 are rotatably supported on main frame 154 and have sprockets 164 and 166 attached thereto, respectively. Endless chain 167 passes around the sprockets 164 and 166 and has push plates 168 and 170 attached thereto equidistant from each other. Shaft 162 extends beyond the main frame 154 and also has attached thereto gear 172. Chain 174 drivingly connects gear 172 with gear 176 attached to the output shaft of motor 178. Motor 178 is attached to main frame 154 by bracket 180. Thus, the motor 178 drives sprocket 166 which causes chain 167 to traverse along the frame 154. Push plate 168 or 170, which ever is on top of the frame 154, contacts the side of the pigment bars in the magazine and pushes them toward chute 28, attached to one end of main frame 154. The pigment bars slide down the chute one at a time due to the width of the chute. The operation of motor 178 is controlled by limit switch 182. Limit switch 182 has actuating rod 184 extending through slot 186 in chute 28 and is of the normally closed type. If a pigment bar comes to rest over slot 186, it pushes down rod 184 thereby opening switch 180 and shutting off motor 178. This prevents any more bars from entering chute 28. Optionally, a cover may be provided over the top of magazine to prevent contamination of the pigment bars by dust, dirt, etc. Signal light 188 may be provided to visually indicate when the magazine 26 is in operation.

Figure 9:
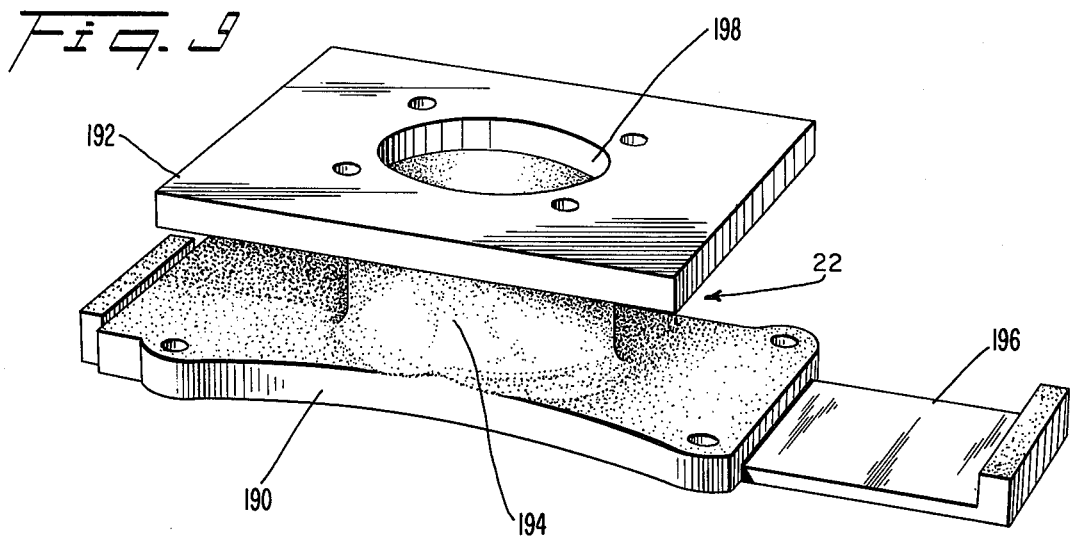
FIG. 9 is a perspective view of the slide valve assembly shown in FIG. 1.

Slide valve 22 is shown in detail in FIG. 9 and comprises base plate 190 which is mounted on housing 16, mounting plate 192 attached to mounting plate 20, hollow connecting portion 194 and slide plate 196. Opening 198 extends completely through slide valve 22 so as to allow passage of the uncolored resin from hopper 12 into housing 16. Slide plate 196 extends across base plate 190 and has an opening therethrough which is aligned with opening 198 when slide plate is in the open position. When slide plate 196 is moved to its closed position, it extends across opening 198 thereby preventing the flow of resin into housing 16. Although slide plate 196 is shown as being manually operable between the open and closed position, it is understood that it could be automated by known valve actuating means.

Figure 10:
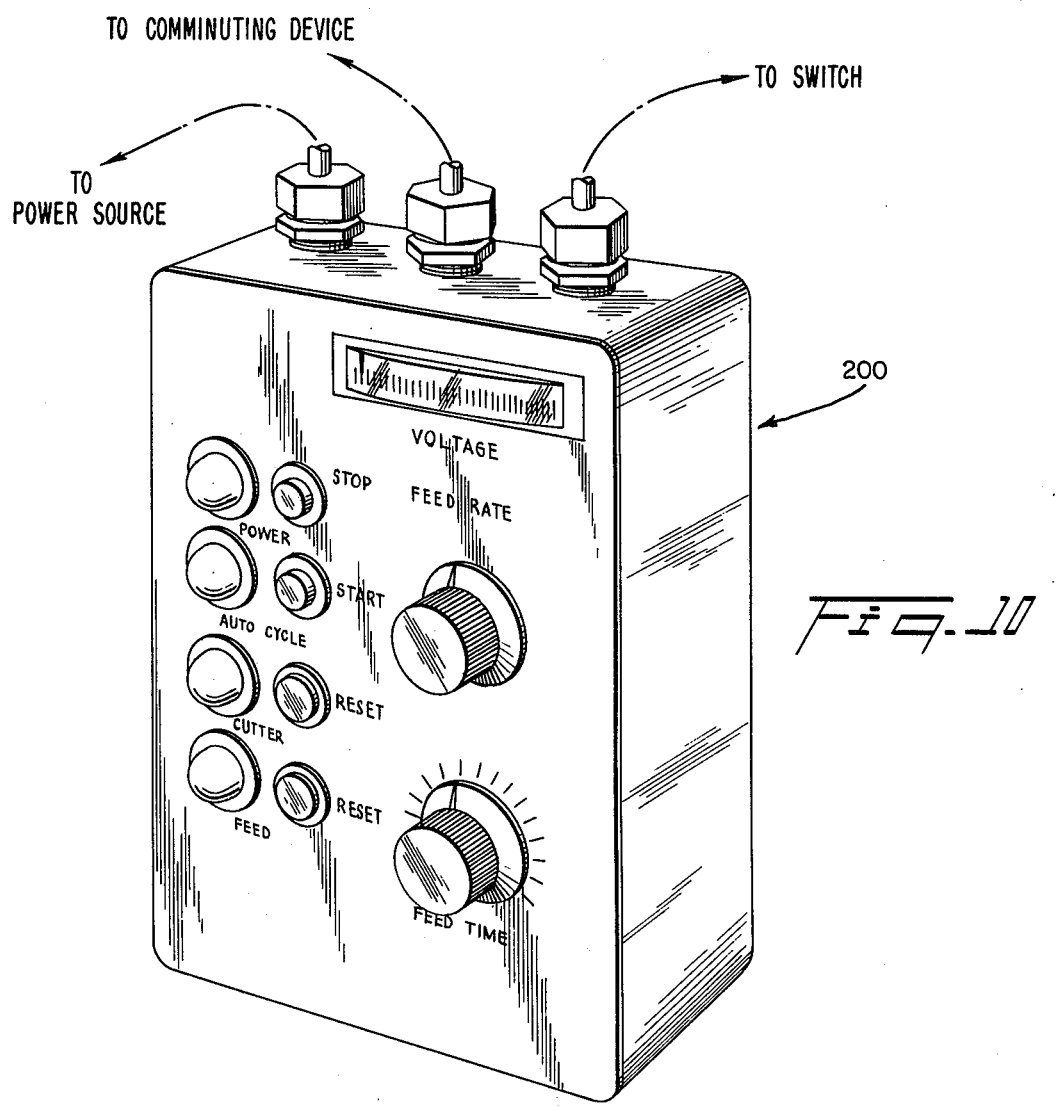
FIG. 10 is a perspective view of a control panel used with the apparatus of FIG. 1.

Control panel 200 is shown in FIG. 10 and provides all control functions for the apparatus. The voltage feed rate dial controls the rate at which the pigment is feed into the uncolored resin. The feed time dial serves to synchronize the comminuting apparatus with the molding apparatus cycle time. If the comminuting device is used in conjunction with a continuous extruder, the function of the time dial may be eliminated and the comminutor operated in a continuous run mode. Wiring diagrams for both the intermittent run control panel and the continuous run control panel are shown in FIGS. 11 and 12, respectively.

What is claimed is:

1. An apparatus for comminuting pigment bar and mixing the comminuted pigment with an uncolored plastic material before said material passes into a plastic article forming machine, said apparatus comprising:
   (a) a housing attached to said plastic article forming machine;
   (b) cutter means rotatably mounted within said housing;
   (c) magazine storage means to store a plurality of colored pigment bars laterally adjacent to each other;
   (d) a feeding mechanism removably attached to said housing to feed said pigment bars into contact with said cutter from said magazine;
   (e) first motor means attached to said housing and drivingly connected to said cutter so as to rotate same;
   (f) second motor means movably attached to said housing and drivingly connected to said feeding mechanism by interengaging gears;
   (g) means to move said second motor out of driving engagement with said feeding mechanism by disengaging said interengaging gears;
   (h) means to operate said feeding mechanism manually when said gears are disengaged;
   (i) a hopper for storing an uncolored plastic material attached to said housing such that said material flows from said hopper into said housing; and
   (j) valve means interposed between said hopper and said housing to control the flow of plastic material into said housing.

2. The apparatus of claim 1 wherein said means to movably attach said second motor means to said housing comprises:
   (a) a plate pivotally attached to said housing, said plate having said second motor means attached thereto;
   (b) an arm attached to said plate and extending exteriorly of said housing, and
   (c) biasing means between said plate and said housing to normally bias the plate in a direction in which said gears are interengaged so as to drive the feeding mechanism.

3. The apparatus of claim 1 wherein said magazine storage means comprises:

(a) a main frame onto which is placed the pigment bars;
(b) an inclined chute attached to a first end of said main frame;
(c) a sprocket rotatably attached to first and second ends of said main frame;
(d) an endless chain engaging said sprockets, said chain having means thereon to move said pigment bars along said frame toward said inclined chute; and
(e) third motor means drivingly connected with one of said sprockets.

4. The apparatus of claim 1 wherein said cutter comprises:
(a) a shaft rotatably mounted in said housing;
(b) a plurality of cutting elements removably attached to said shaft, said cutting elements arranged in at least two circumferentially spaced rows; and
(c) means connecting said shaft with said first motor means such that said first motor causes said shaft to rotate.

5. The apparatus of claim 4 wherein said circumferentially spaced rows of cutting elements are spaced such that only one row contacts a pigment bar at any given time.

* * * * *